March 27, 1928.  1,664,025
E. L. ETHERIDGE
LICENSE PLATE HOLDER
Filed Jan. 2, 1926
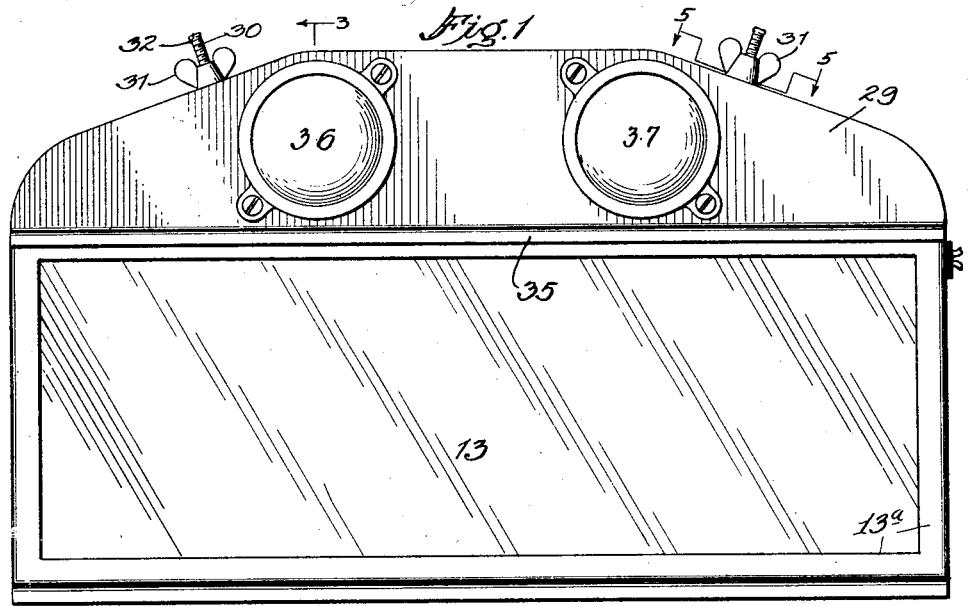
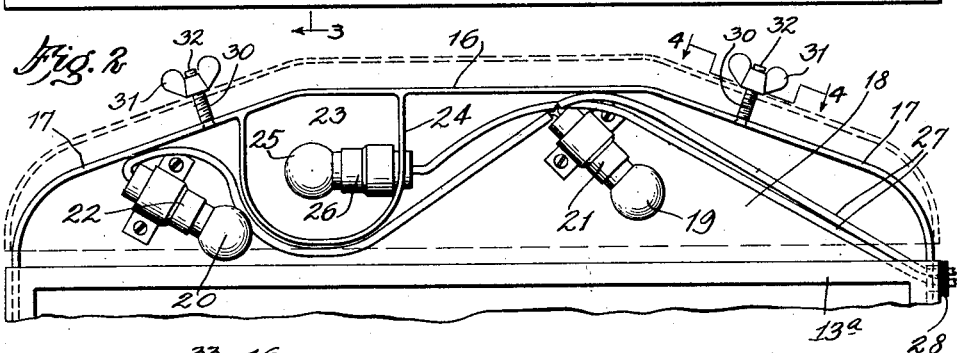
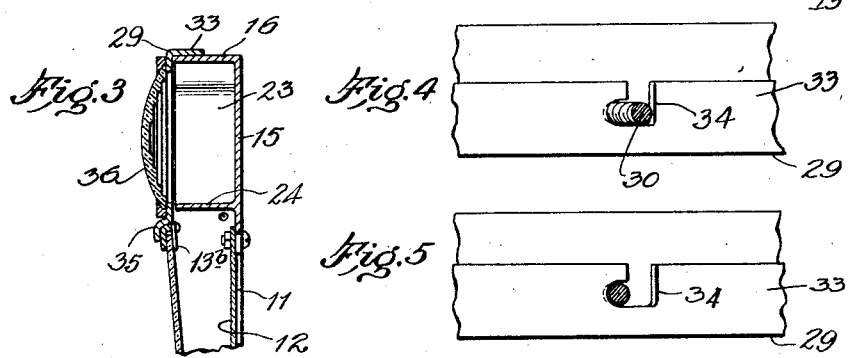
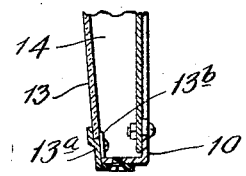
INVENTOR
Ernest L. Etheridge
BY
Howard E. Thompson
ATTORNEY Patented Mar. 27, 1928.

1,664,025

UNITED STATES PATENT OFFICE.

ERNEST L. ETHERIDGE, OF BROOKLYN, NEW YORK.

LICENSE-PLATE HOLDER.

Application filed January 2, 1926. Serial No. 78,793.

This invention relates to license plate holders and particularly to devices of this class wherein the entire license plate may be illuminated; and the object of the invention is to provide a casing in connection with the back wall of which a license plate may be supported, the front of the casing being open and closed by a transparent panel arranged at an inclination whereby light rays from bulbs supported at the top of the casing will be reflected from said transparent panel onto the entire license plate; a further object being to provide a device of the class described with a chamber within the casing between the license plate and the transparent panel, said chamber opening upwardly into a reflector chamber or compartment in the top of the casing, and means being provided for supporting bulbs at the opposite end portions of the casing for illuminating the chamber of the casing, and a closed compartment being arranged in the top of the casing with means for supporting a bulb therein; a still further object being to provide the top portion of the casing with a removable front plate or cover with means for quickly attaching and detaching said cover, whereby access to all of the bulbs may readily be accomplished for adjustment, repair or replacement; and said cover supporting lenses, one of which is exposed to the closed compartment only, and the other of which is exposed to one of the bulbs supported in the upper end of the casing or to the chamber in the upper end of the casing; and with these and other objects in view, the invention consists in a device of the class and for the purpose specified, which is simple in construction, efficient in use, and which is constructed as hereinafter described and claimed.

The invention is fully disclosed in the following specificaiton, of which the accompanying drawing forms a part, in which the separate parts of my improvement are designated by suitable reference characters in each of the views, and in which:

Fig. 1 is a front view of the license plate holder made according to my invention.

Fig. 2 is a view similar to Fig. 1 with the cover removed but illustrating the cover partially removed in dotted lines, and with part of the construction broken away.

Fig. 3 is a partial section on the line 3—3 of Fig. 1.

Fig. 4 is a section on the line 4—4 of Fig. 2; and,

Fig. 5 is a section on the line 5—5 of Fig. 1.

In carrying my invention into effect, I provide an elongated casing 10, the back of the casing being open as shown at 11, which opening is closed by the license plate 12 mounted in the casing and secured to the back wall around the opening 11, therein. The front wall of the casing is also open and adapted to be closed by a transparent panel 13, which is supported in a removable, elongated, rectangular frame 13$^a$ constituting the front wall of the casing, the panel 13 being retained in the frame by keepers 13$^b$, note Fig. 3 of the drawing. The front wall and this panel is arranged at an inclination so that the lower end of the panel 13 is closer to the license plate than the upper end, whereby light rays coming from the top of the casing and into the chamber 14 of the casing will be reflected onto the entire license plate, thus eliminating any possibility of shadows to be cast upon any part of the plate.

The top of the casing is closed by a back wall 15 and the top wall 16 is tapered downwardly at the opposite sides as shown at 17 and gradually curved into the side walls of the casing. The chamber 18 within the top of the casing opens into the chamber 14 whereby electric light bulbs 19 and 20 mounted in suitable sockets 21 and 22 respectively will illuminate, by reason of their location in the top of the casing, the entire chamber 14 and exposed face of the license plate, so that all of the numerals thereon may be readily seen at a comparatively great distance.

It will be noted that the sockets 21 and 22 are arranged in the plane of the back wall 15 of the casing whereby a comparatively narrow casing can be employed, thus producing a very neat and finished appearance to the entire device. A closed chamber 23 is formed by a baffle wall 24 within the chamber 18, and an electric light bulb 25 is supported in the chamber 23 by a socket 26 mounted in the baffle wall 24, and said baffle wall serves to shield the bulb 25 from the chambers 14 and 18, or the chamber 23 is shielded from the bulbs 19 and 20 by said baffle wall. The electric wires 27 for all of the bulbs or the sockets thereof pass outwardly through an insulated block 28 mounted in one side of the casing.

The upper end of the casing opens outwardly at the front and is adapted to be closed by a front panel or cover 29. To provide for the quick attachment and detachment of said cover, I employ two screws 30 which are riveted to the top wall 16—17 and project thereabove, and on which are mounted winged nuts 31, held against displacement on the screws 30 by heading the upper ends of the screws as shown at 32. The cover 29 is provided with a backwardly directed flange 33 which overlaps and rests upon the wall 16—17 and is provided with L-shaped apertures 34 opening outwardly through the flange to permit the passage of the cover onto the screws 30, and the movement of the screws in said apertures in locking the cover 29 in position as seen in Figs. 4 and 5 of the drawing.

The front wall of the cover 29 is provided with an outwardly and downwardly directed flange 35 which overlaps the upper end portion of the front wall of the casing and prevents water from entering the casing at this point as will be understood, and also serves to retain the cover 29 in proper position on the casing. Two lenses 36 and 37 are supported on the cover 29 and the lens 36 is adapted to register with the chamber 23 only of the casing while the lens 37 registers with the chamber 18 at the top of the casing adjacent the bulb 19, the latter lens being the normal rear danger signal or tail light, while the lens 36 operates as a stop light, and its illumination or operation is controlled automatically in the stopping of the vehicle, as other devices of this class.

It will be understood that any suitable means may be provided for supporting my improved license plate in connection with a motor vehicle and by virtue of the size and dimensions of the entire casing, the same may be conveniently supported at the conventional places on the vehicle provided for supporting license plates, especially in that the complete casing takes up very little additional space than the space required for the plate itself. With a casing of the class described, in the event that any one of the bulbs employed should burn out or need replacement or adjustment by merely loosening the screws 31, the cover 29 may be removed and access to all of the bulbs is thereby provided. This result may be accomplished without the use of tools or implements of any kind or class, thus rendering the device practical and efficient. It will be apparent that by virtue of the simplicity of the general design of the casing, the same may be readily kept clean at all times.

It will also be understood that while I have shown certain details of construction for carrying my invention into effect, that I am not necessarily limited to these details and various changes therein and modifications thereof may be made within the scope of the appended claims without departing from the spirit of my invention or sacrificing its advantages.

Having fully described my invention, what I claim as new and desire to secure by Letters-Patent, is:—

1. A license plate holder comprising a narrow box-shaped casing, means for supporting the license plate in said casing, a chamber in said casing and extending into the top portion thereof, said chamber at the top of the casing opening outwardly through the front wall thereof, a cover plate for closing said opening at the top of the casing, stop light and tail light lenses in said cover plate, means for supporting independent electric bulbs in said chamber in alinement with said lenses, means encircling one of said bulbs mounted in said chamber to direct the light outwardly through the lenses registering therewith, and not into said chamber.

2. A license plate holder comprising a narrow box-shaped casing, means for supporting the license plate in said casing, a chamber in said casing and extending into the top portion thereof, said chamber at the top of the casing opening outwardly through the front wall thereof, a cover plate for closing said opening at the top of the casing, stop light and tail light lenses in said cover plate, means for supporting independent electric bulbs in said chamber in alinement with said lenses, means encircling one of said bulbs mounted in said chamber to direct the light outwardly through the lenses registering therewith, and not into said chamber, and other means for supporting an electric bulb in said chamber to cooperate with the other of the first named bulb supporting means whereby bulbs mounted therein are operated to illuminate the entirety of said casing.

3. A license plate holder comprising a narrow box-shaped casing, means for supporting the license plate in said casing, a chamber in said casing and extending into the top portion thereof, said chamber at the top of the casing opening outwardly through the front wall thereof, a cover plate for closing said opening at the top of the casing, stop light and tail light lenses in said cover plate, means for supporting independent electric bulbs in said chamber in alinement with said lenses, means encircling one of said bulbs mounted in said chamber to direct the light outwardly through the lenses registering therewith, and not into said chamber, other means for supporting an electric bulb in said chamber to cooperate with the other of the first named bulb supporting means, whereby bulbs mounted therein are operated to illuminate the entirety of said casing, and said cover plate having a flange overlying the upper edge of the casing to form a watertight connection between the casing and cover member.

4. A license plate holder comprising a narrow box-shaped casing, means for supporting the license plate in said casing, a chamber in said casing and extending into the top portion thereof, said chamber at the top of the casing opening outwardly through the front wall thereof, a cover plate for closing said opening at the top of the casing, stop light and tail light lenses in said cover plate, means for supporting independent electric bulbs in said chamber in alinement with said lenses, means encircling one of said bulbs mounted in said chamber to direct the light outwardly through the lenses registering therewith, and not into said chamber, other means for supporting an electric bulb in said chamber to cooperate with the other of the first named bulb supporting means whereby bulbs mounted therein are operated to illuminate the entirety of said casing, and said cover plate having a flange overlying the upper edge of the casing to form a watertight connection between the casing and cover member, and means on the casing and cover member permitting quick attachment and detachment of the cover member to give access to the chamber at the top portion of the casing, and the bulb supporting means therein.

5. A license plate holder comprising a narrow box-shaped casing, means for supporting the license plate in said casing, a chamber in said casing and extending into the top portion thereof, said chamber at the top of the casing opening outwardly through the front wall thereof, a cover plate for closing said opening at the top of the casing, stop light and tail light lenses in said cover plate, means for supporting independent electric bulbs in said chamber in alinement with said lenses, means encircling one of said bulbs mounted in said chamber to direct the light outwardly through the lenses registering therewith, and not into said chamber, other means for supporting an electric bulb in said chamber to cooperate with the other of the first named bulb supporting means whereby bulbs mounted therein are operated to illuminate the entirety of said casing, and said cover plate having a flange overlying the upper edge of the casing to form a watertight connection between the casing and cover member, means on the casing and cover member permitting quick attachment and detachment of the cover member to give access to the chamber at the top portion of the casing and the bulb supporting means therein, and said bulb supporting means being arranged in parallel relation with the back wall of the casing, and the circuit wires employed therewith extending out through the casing from a block of insulating material.

6. A license plate holder comprising an elongated, narrow, box-shaped casing, the top of which is provided with an extension, the front wall of the casing proper having a transparent panel arranged at an inclination to the vertical plane of the casing, means for supporting a license plate at the back of the casing proper, the front extension of the casing being open, and the chamber in said extension opening downwardly into the chamber of the casing proper, means for supporting a plurality of electric light sockets within the chamber of said extension, a hood within said chamber for encircling one of said sockets and the bulb thereof to confine the light of said bulb to a given path, a closure plate for the extension of said casing said plate having spaced lenses, one of which is adapted to register with the last named socket and bulb supported therein and the other with the chamber within said extension, the lower end of said cover having a flange overlying the upper edge of the transparent front wall of the casing proper and a flange overlying the top and side walls of said extension, and means for detachably securing the cover plate in connection with said extension.

In testimony that I claim the foregoing as my invention I have signed my name this 28th day of December, 1925.

ERNEST L. ETHERIDGE.